US007324500B1

(12) United States Patent
Blackmon et al.

(10) Patent No.: US 7,324,500 B1
(45) Date of Patent: Jan. 29, 2008

(54) ROUTER NETWORK PROTECTION USING MULTIPLE FACILITY INTERFACES

(75) Inventors: Harry C. Blackmon, Plano, TX (US); Tony M. Brewer, Plano, TX (US); Harold W. Dozier, Dallas, TX (US); Thomas C. McDermott, III, Plano, TX (US); Gregory S. Palmer, Plano, TX (US)

(73) Assignee: Jeremy Benjamin as Receiver for Chiaro Networks Ltd., Tel Aviv (IL)

( * ) Notice: Subject to any disclaimer, the term of this patent is extended or adjusted under 35 U.S.C. 154(b) by 1308 days.

(21) Appl. No.: 09/703,027

(22) Filed: Oct. 31, 2000

(51) Int. Cl.
*H04L 12/28* (2006.01)
(52) U.S. Cl. .................... 370/351; 370/228
(58) Field of Classification Search ............. 370/351, 370/428, 354, 353, 359, 360, 386, 390, 395.51, 370/216, 218, 228, 397, 466, 352, 356, 357, 370/395.1, 406, 395.21, 217, 219, 220, 221, 370/225, 227, 392, 400, 401; 385/17, 16; 714/9; 398/54
See application file for complete search history.

(56) References Cited

U.S. PATENT DOCUMENTS

| 4,878,726 | A | * | 11/1989 | Fatehi ..................... 385/16 |
| 5,844,887 | A | * | 12/1998 | Oren et al. .............. 370/218 |
| 6,075,767 | A | * | 6/2000 | Sakamoto et al. ........ 370/228 |
| 6,118,779 | A | * | 9/2000 | Madonna ................. 370/353 |
| 6,160,811 | A | * | 12/2000 | Partridge et al. ......... 370/401 |

(Continued)

OTHER PUBLICATIONS

U.S. Appl. No. 09/703,043, filed Oct. 31, 2000, Harry C. Blackmon et al.

(Continued)

*Primary Examiner*—Phirin Sam
(74) *Attorney, Agent, or Firm*—Harold L. Novick; Matthew J. Moffa; The Nath Law Group

(57) ABSTRACT

A router line card is partitioned to separate the packet forwarding functions from physical port interfacing. For each packet forwarding card, at least one redundant port interface is provided. Identical input packets are transmitted via these redundant input port interfaces, one of which is eventually selected based on, for example, SONET standard criteria. If there is a failure, the router selects the interface path that is operating properly and rejects the path containing a failed element. Thus, the router decides locally how to correct the problem internally. Moreover, following an equipment failure the now offline failed interface path can be replaced, while the equipment remains in service using the duplicated interface path. The system can be restored to full duplex operation without affecting the existing traffic, providing for a hot replacement of a failed path. Because the interfaces are separate, a failed module can be renewed and replaced while the equipment is in service. If a failure occurs in an interface card between two peer routers, then packets flow between the two routers uninterrupted from exactly the same previous ports on one router to the same previous ports on the second router, using the same Internet protocol addresses as existed prior to the switching.

34 Claims, 8 Drawing Sheets

U.S. PATENT DOCUMENTS

| | | | |
|---|---|---|---|
| 6,272,107 B1 * | 8/2001 | Rochberger et al. | 370/216 |
| 6,408,000 B1 * | 6/2002 | Lamberg et al. | 370/390 |
| 6,452,934 B1 * | 9/2002 | Nakata | 370/428 |
| 6,477,139 B1 * | 11/2002 | Anderson et al. | 370/216 |
| 6,563,831 B1 * | 5/2003 | Dally et al. | 370/401 |
| 6,571,355 B1 * | 5/2003 | Linnell | 714/9 |
| 6,597,826 B1 * | 7/2003 | Ramaswami et al. | 385/17 |
| 6,650,646 B1 * | 11/2003 | Galway et al. | 370/397 |
| 6,658,021 B1 * | 12/2003 | Bromley et al. | 370/466 |
| 6,661,772 B2 * | 12/2003 | Matsuno et al. | 370/216 |
| 6,661,788 B2 * | 12/2003 | Angle et al. | 370/390 |
| 6,711,357 B1 * | 3/2004 | Brewer et al. | 398/54 |
| 6,813,241 B1 * | 11/2004 | Wang et al. | 370/228 |
| 6,829,237 B2 * | 12/2004 | Carson et al. | 370/386 |
| 6,850,531 B1 * | 2/2005 | Rao et al. | 370/401 |
| 6,906,997 B1 * | 6/2005 | Rajan et al. | 370/216 |
| 6,920,156 B1 * | 7/2005 | Manchester et al. | 370/522 |
| 6,925,054 B1 * | 8/2005 | Atterton et al. | 370/218 |
| 6,975,587 B1 * | 12/2005 | Adamski et al. | 370/217 |
| 6,980,543 B1 * | 12/2005 | Kastenholz et al. | 370/352 |
| 7,031,252 B1 * | 4/2006 | Hosler et al. | 370/217 |
| 7,233,567 B1 * | 6/2007 | Li | 370/217 |

OTHER PUBLICATIONS

U.S. Appl. No. 09/703,064, filed Oct. 31, 2000, Thomas C. McDermott, III et al.

Edmaier, B., et al., "Alignment Server for Hitless Path Switching in ATM Networks," Telecom Report International, Siemens AG, Berlin, Apr. 1995, pp. 57-61.

Ohta, H., et al., "Hitless Line Protection Switching Method for ATM Networks," NTT Transmission Systems Laboratories, Japan, 1993, pp. 272-276.

Rathgeb, E. P., et al., "The Main StreetXpress Core Services Node—A Versatile ATM Switch Architecture for the Full Service Network," Public Communication Networks Group, Broadband Networks, SeimensAG, Germany, Dec. 1996, pp. 795-806.

Spiess, K., et al., "Erhohte Betriebssicherheit von 2-Mbit/s-Ubertragungsstrecken," Telecom Report, Siemens AG, Munchen, May 1985, pp. 208-213.

European Search Report issued for EP 01 30 9175, dated Apr. 29, 2004, 3 pages.

* cited by examiner

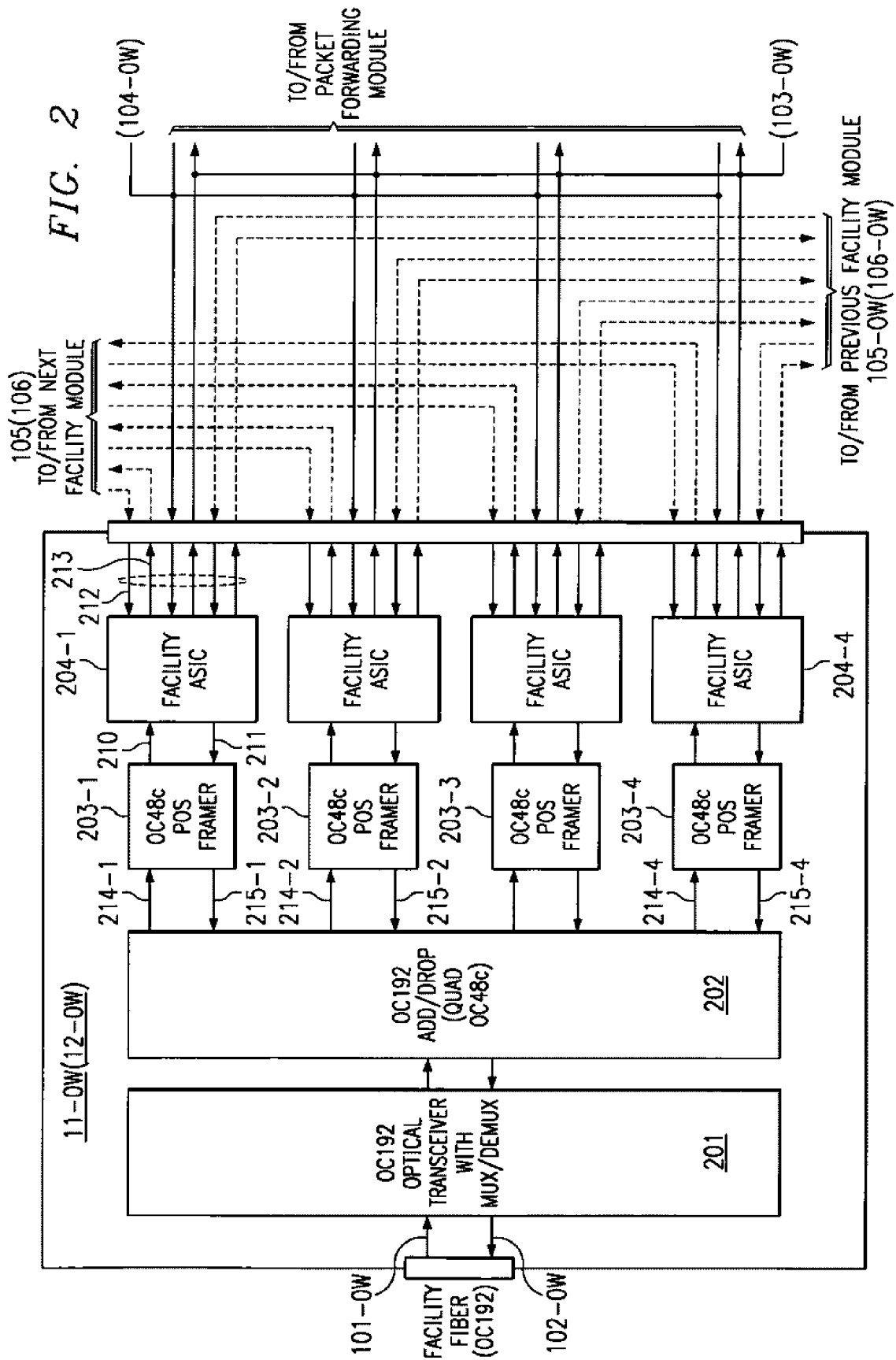

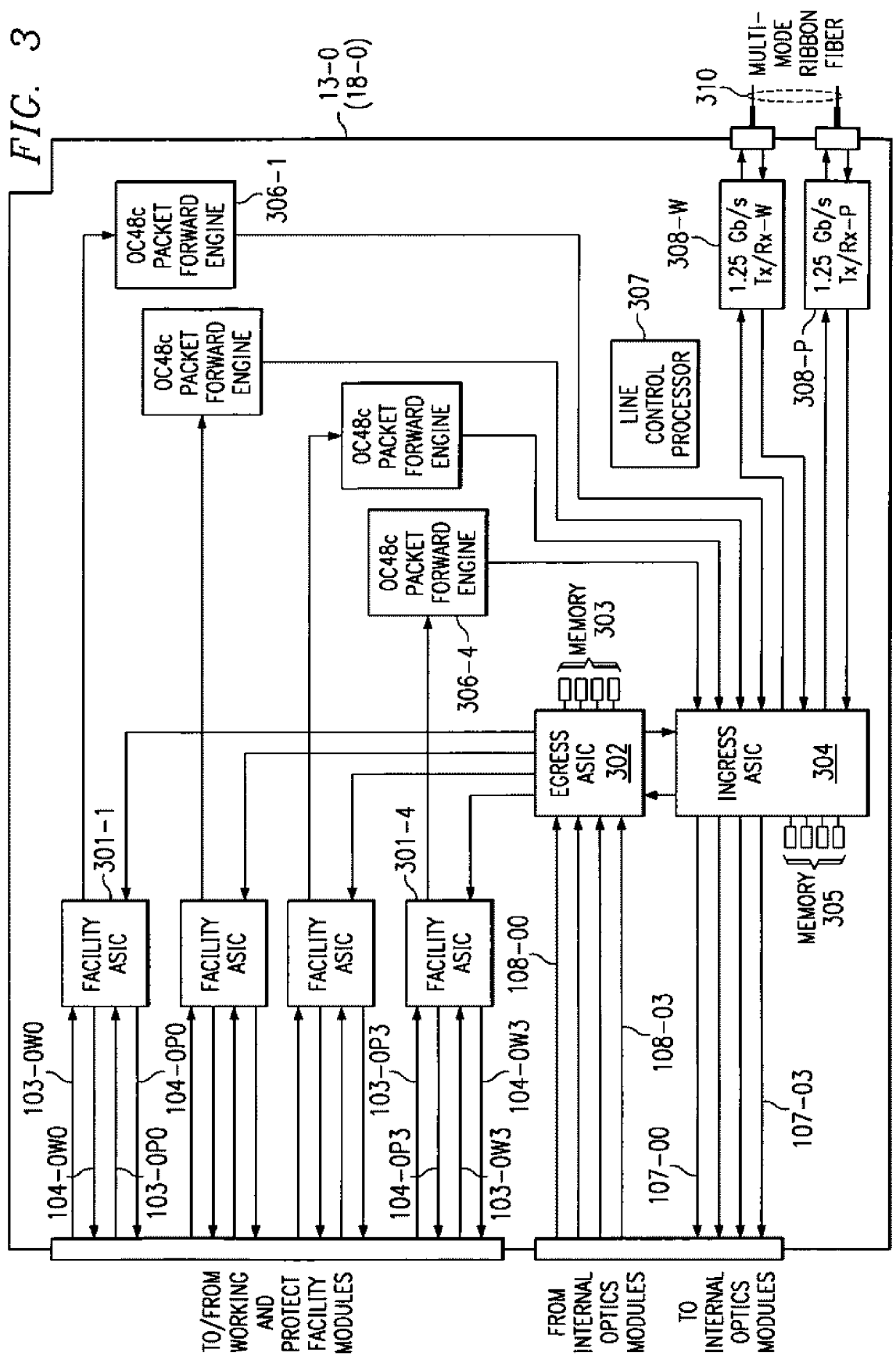

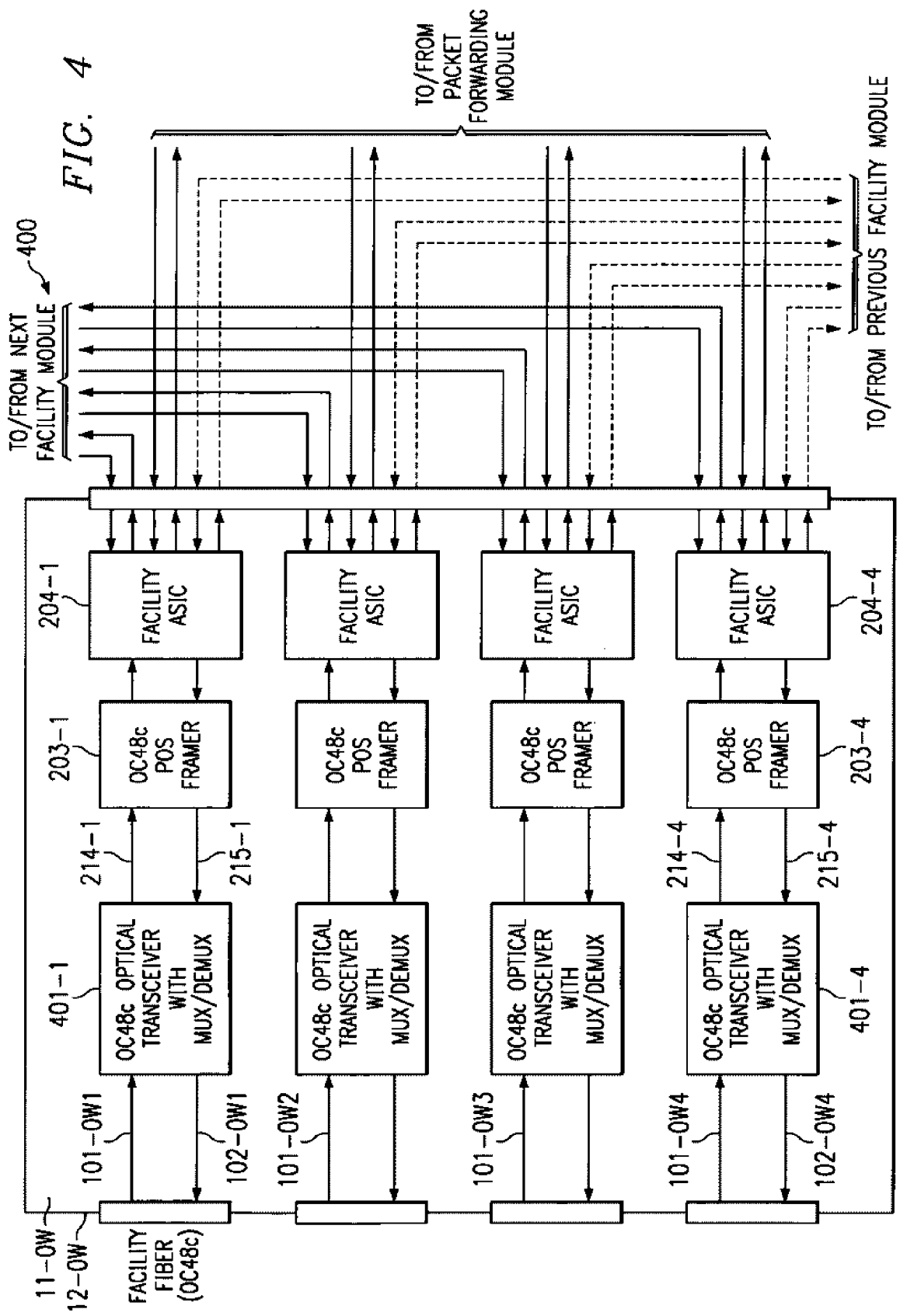

ROUTER NETWORK PROTECTION USING MULTIPLE FACILITY INTERFACES

RELATED APPLICATIONS

This application is related to concurrently filed, co-pending, and commonly assigned U.S. application Ser. No. 09/703,043, filed Oct. 31, 2000, entitled "Router Line Card Protection Using One-for-N Redundancy" and to concurrently filed, co-pending, and commonly assigned U.S. application Ser. No. 09/703,064, filed October 31, 2000, entitled "Router Switch Fabric Protection Using Forward Error Correction," the disclosures of both of which are incorporated herein by reference.

TECHNICAL FIELD

This application relates to the field of optical communication networks, and particularly to large-scale routers for optical communication networks.

BACKGROUND

The Synchronous Optical Network (SONET) standard is used for communication on fiber optic cables between routers in a telecommunications network. The fiber network uses multiple cable paths operating in tandem, such that data that fails to arrive at a destination (due to a fault in one path) will arrive over the tandem fiber path. However, Internet Protocol (IP) routers that have optical ports based on Packet-over-SONET protocols have not been protected from optical receiver device failures or from optical fiber breaks with any kind of hot standby immediate patch protection mechanism. Typical designs depend upon external routing of IP packets and flows to restore packet traffic around an optical failure in either the outgoing or the incoming ports of the router. This method of protection is very slow and is very cumbersome to engineer and to administer. Without fast acting hot standby protection, a network must be engineered with duplex and multiple routers and with less than fully utilized traffic capacity on each port. Then in the event of a facility or port failure during operation, all traffic must be redirected from the failed port to another port, which is available but underutilized and which has enough intrinsic capacity to carry the additional traffic under such a failure circumstance.

The first problem is not what happens once the failure occurs, but the way the network must be engineered to provide this complex protection structure. Once duplex routers or multiple routers are engineered into the network to address this type of failure, then typically it is required to engineer additional link capacity into the network between those routers. Whereas an unprotected network might require only a single trunk that is 100% utilized between two routers, a protected network under current technology requires a second trunk. The utilization of each one of the trunks in the absence of failure falls to only 50%. This increases the cost not only of the equipment, but of the router itself that now includes redundancy, software costs relating to the intervening network capacity, fiber optic transmission capacity including increased overhead traffic between routers, and administrative and engineering effort.

In prior art schemes an internal failure within one part of a router would have to be protected by rerouting of the trunk outside of that router, perhaps encompassing several other routers in an existing network. Failure of a cable at a router can in fact propagate significantly far through a network, resulting in substantial confusion to the network as it adjusts to reconfigured routing. The network must broadcast to much of the Internet any IP addresses, for example, that have changed. Thus, small localized failures produce impacts that ripple out through the network, even though their original cause may not have been significant.

Not only do the packets get re-routed, but there is of necessity broadcast information that has to be sent to various routers to handle the re-routed traffic. In situations where outages occur from time to time, this can become overwhelming to a network. Even in the best case, the time to perform a repair and restore the original configuration can cause network traffic to slow dramatically. Again, this affects the capacity of a network, which in the initial stage would have to be engineered for higher capacity than would otherwise be necessary.

A common problem is an intermittent fault in a network, coming into and going out of service repetitively, thereby causing the generation of rerouting messages almost continuously through the network, known in the industry as "route-flap", resulting in much non-useful traffic.

Consequently, there is a need in the optical network art for router systems and methods that provide protection in the event of a failure, with a smaller investment in equipment and engineering effort than in the prior art. Further, there is a need for router failure protection that requires minimal disruption and reconfiguration of the larger network, and that provides seamless continuity of service in the event of a single point of failure.

SUMMARY OF THE INVENTION

The present invention is directed to a system and method which involves partitioning the router line card to separate the packet forwarding functions from physical port interfacing. For each line card that has a set of packet forwarding functions, at least one redundant port interface is provided. Identical input packets are transmitted via these redundant input port interfaces, one of which is eventually selected, based on various optical data characteristics. In this application, a Synchronous Optical Network (SONET) line mechanism is utilized for detection of these optical data characteristics.

If there is a failure of a cable or fiber inside a router, or of a facility module on the router, or of an optical interface module in the equipment feeding the router, the system will switch locally (at the router) around the detected failure. In operation, the router will select the interface path that is operating properly, bypassing around the path that contains some failed element. Thus, the router will make a local decision as to how to correct the problem internally. In this manner, failures do not ripple throughout the network, but typically are contained within the router itself.

Moreover, after an equipment failure the now offline failed facility path can be replaced while the equipment remains in service using the duplicated protection facility path. The system can be brought back to full duplex operation without affecting the existing traffic. This provides for a hot replacement of a failed path. Because the facility interfaces are separate, a failed module can be renewed and replaced while the equipment is in service. If a particular facility module needs to be removed for maintenance purposes on one data bus, the duplicate data bus is maintained intact, allowing for hot replacement of any of the facility modules, working and protect, even if a packet forwarding module protection switch is in effect at the time, as described below in more detail.

According to the principles of the present invention, if two peer routers in a network are connected by a trunk between them, and a failure occurs on a working facility card and a protection switch occurs from the working facility card to a duplicate protection facility card, then packets that flow between the two routers continue to flow uninterrupted from exactly the same previous ports on one router to the same previous ports on the second router. The packets continue to use the same IP addresses as existed prior to the switching. In prior solutions, by contrast, the packets would have to be routed around the failed working facility card and around the usable port on the peer router to a different useable port on the source router and a different port on the peer router. IP packet addresses would have to be changed.

Various aspects of the invention are described in concurrently filed, co-pending, and commonly assigned U.S. application Ser. No. 09/703,043, filed Oct. 31, 2000, entitled "Router Line Card Protection Using One-for-N Redundancy" and to concurrently filed, co-pending, and commonly assigned U.S. application Ser. No. 09/703,064, filed Oct. 31, 2000, entitled "Router Switch Fabric Protection Using Forward Error Correction," the disclosures of both of which are incorporated herein by reference.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of primary objects of the present invention and thus are not in general protected against.

From the foregoing discussion, it will be evident that embodiments of the present invention provide substantial advantages over prior art systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 is a block diagram illustrating data flow through facility modules in more detail;

FIG. 3 is a block diagram illustrating information flow through a typical packet forwarding module;

FIG. 4 is a schematic diagram illustrating an alternative implementation of the facility module shown in FIG. 2;

DETAILED DESCRIPTION

Figure 1A:
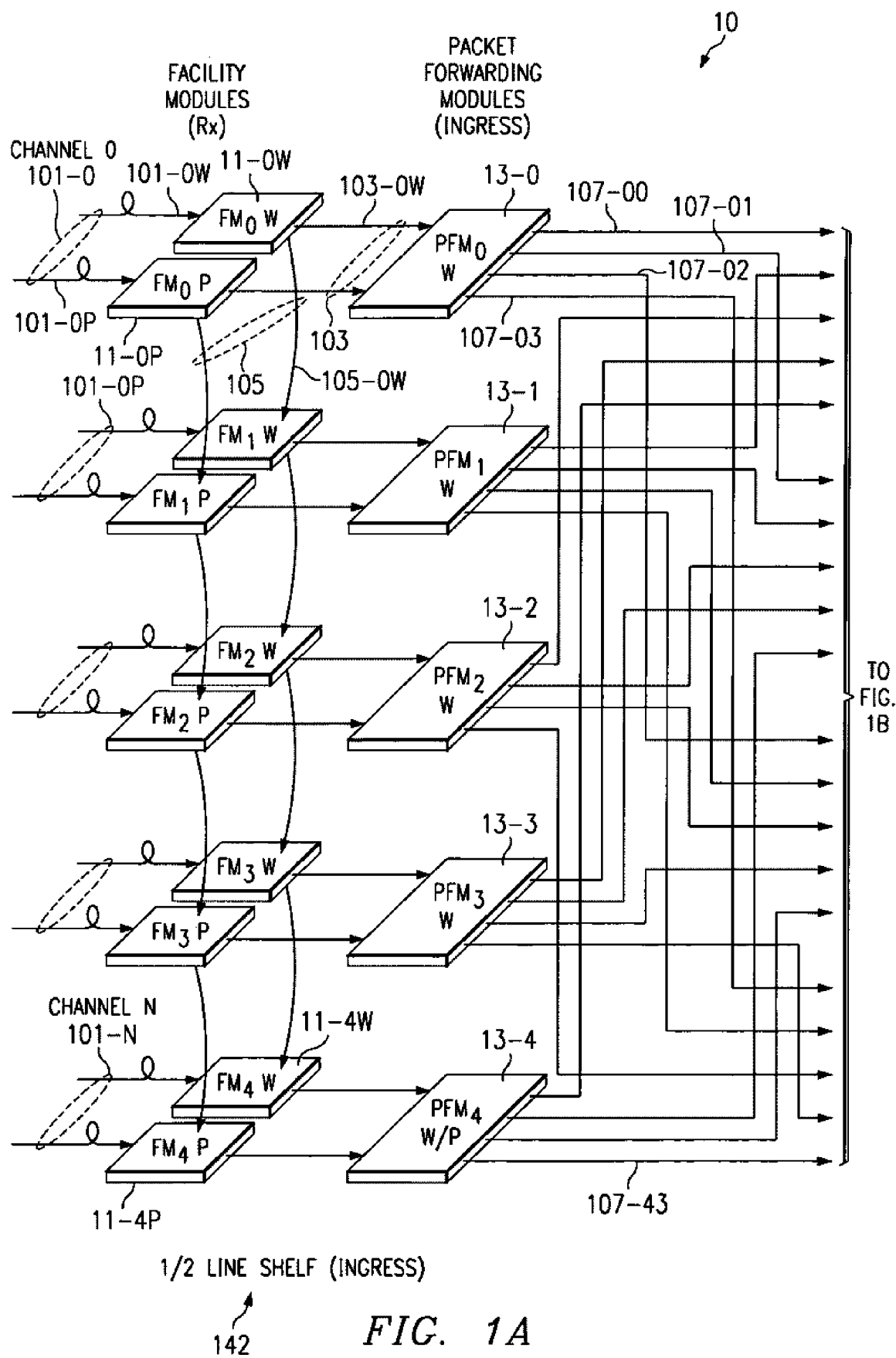
FIGS. 1A-1C form a schematic diagram showing an overview of the data paths through a router, in an embodiment of the present invention.
Figure 1B:
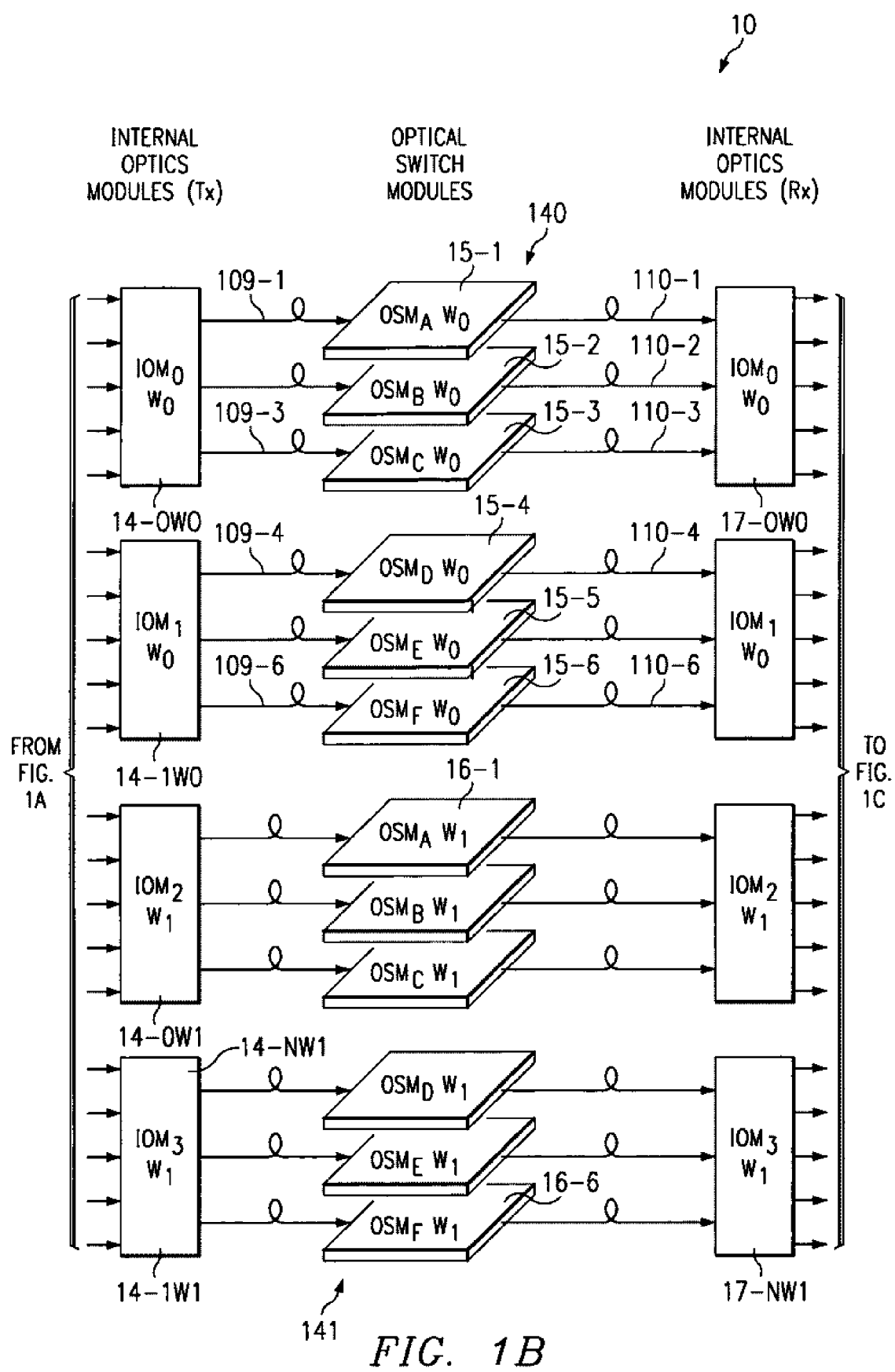
Figure 1C:
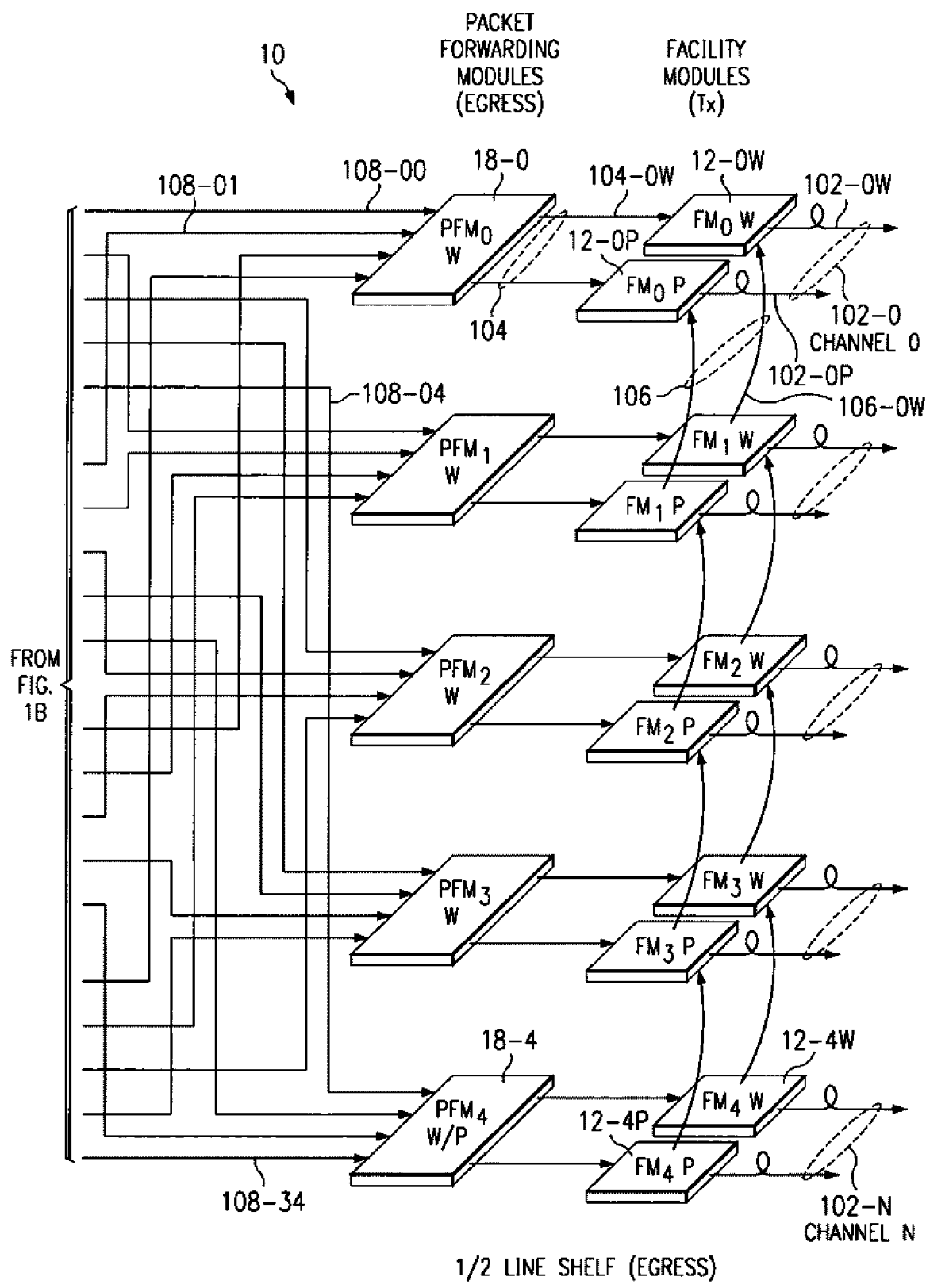

FIGS. 1A-1C form a schematic diagram showing an overview of the data paths through a router 10, in an embodiment of the present invention. For ease of understanding, FIGS. 1A-1C are partitioned into three sequentially adjacent panels. FIGS. 1A-1C do not show how router system 10 is wired, but simply illustrates the flow of data. At the upper left portion of FIG. 1A, an input 101-0 is a first SONET data channel, formatted as Packet-over-SONET in the present embodiment. Input 101-0 includes two optical fibers, namely a working input fiber 101-0W and a protect input fiber 101-0P. Fibers 101-0W, 101-0P carry duplicated information into router 10 from a peer source equipment e.g., another router or piece of SONET transmission equipment, compatible with the Packet-over-SONET format. Protect and working facility module cards 11-0P and 11-0W independently receive duplicate input from respective optic fibers 101-0P and 101-0W and perform an integrity check on the information by computing SONET parity and SONET framing words to determine if the information is valid, and independently check SONET protection switching 'K' Bytes. Both facility modules 11-0W and 11-0P perform essentially identical functions on the information. Each facility module independently evaluates the SONET frame and determines whether the information contained on it is valid. Facility modules 11-0W and I-0P then extract packets from their respective SONET frames and transfer those packets over a packet bus 103 to a packet forwarding module (PFM) 13-0.

Working facility module 11-0W and protect facility module 11-0P respectively provide duplicate input interfaces 103-0W and 103-0P to packet forwarding module 13-0. A system controller (not shown in FIGS. 1A-1C) examines the status of facility modules 11-0W and 11-0P and selects as the in-service facility module the one that is receiving properly framed and bit-error-free packets on its input, in accordance with the SONET standard or as selected by SONET 'K' Bytes. Should the information coming into a facility module, for example facility module 11-0P, have bit errors or other defects, then facility module 11-0P raises an alarm at the system controller (not shown in FIGS. 1A-1C). The system controller then selects facility module 11-0W as the source of input from that channel, and facility module 11-0W strips the packets out of the SONET framing overhead and transfers those raw packets over industry standard bus 103-0W to packet forwarding module 13-0. Typically facility modules 11-0W and 11-0P, along with packet forwarding module 13-0, are contained in a line shelf, denoted in FIG. 1A as ½ line shelf 142 (ingress) and described below in more detail.

There are actually N+1 multiple packet forwarding modules 13-0 through 13-N. In FIG. 1A, N equals 4, providing for four working packet forwarding modules 13-0 through 13-3 and a fifth designated protect packet forwarding module 13-4. In this case protect packet forwarding module 13-4 is a spare module available to replace any working module 13-0 through 13-3. Should any one of working packet forwarding modules 13-0 through 13-3 fail, then fifth packet forwarding module 13-4 can substitute for the failed packet forwarding module 13-0 through 13-3. This protection configuration is known as "one-for-four" protection. Similarly, on the output side of router 10 shown in the right side portion of FIG. 1C, packet forwarding modules 18-0 through 18-3 are all working modules, and packet forwarding module 18-4 is a spare protect packet forwarding module available as a replacement in the event of failure of any working packet forwarding module 18-0 through 18-3. Typically packet forwarding modules 18-0 through 18-4 are contained in a line shelf, denoted in FIG. 1C as ½ line shelf 143 (egress) and described below in more detail.

Protection works through a daisy-chain data bus 105 cascading from Channel 0 to Channel 1, to Channel 2, to Channel 3, and to Channel 4, linking facility modules 11-0W through 11-4W. A duplicate data bus interconnects from Channel 4 up to Channel 0, linking facility modules 11-4P through 11-0P. If for example packet forwarding module 13-1 were to fail, then input facility modules 11-1P and 11-1W send their traffic down data bus 105 linking facility modules 11-2 and 11-3 to facility module 11-4, which then switches those inputs to protect packet forwarding module 13-4. Thus if one channel fails, traffic, instead of going through the failed channel, goes down data bus chain 105 to designated protect module 13-4. If a particular facility module needs to be removed for maintenance purposes on one data bus, the duplicate data bus is maintained intact, allowing for hot replacement of any of the facility modules, working and protect, even if a packet forwarding module protection switch is in effect at the time. Similarly on the output side of router 10, output data is rerouted up a data bus chain 106 to Channel 1 and then out of router 10.

In operation, if PFM 13-1 fails, a microprocessor in the line shelf containing the failed packet forwarding module detects the failure, notices if the system is configured for one-for-four protection, and instructs switches on facility modules 11-1 through 11-4 to switch traffic that used to be in Channel 1 down to Channel 4. Channel 4 contains facility modules 11-4P and 11-4W on the input side and facility modules 12-4P and 12-4W on the output side respectively of router 10. These modules are connected to optical inputs and outputs only when utilizing protect PFM 13-4 or 18-4 as a working module and not as protection for PFMs w 13-0 through 13-3 or 18-0 through 18-3. If PFM 13-4 or 18-4 is a working module, then daisy chain bus 105, 106 is not utilized in any way, and there are simply 5 working inputs and 5 working outputs. Accordingly, two modes of operation are available; namely one-for-N protection, for example one-for-four; or zero-for-five protection, meaning no protect modules and five working modules. Without requiring any wiring changes, router system 10 will function in either mode.

An alternative operating mode designates input 101-N and output 102-N for lower priority traffic. That traffic would be deliberately interrupted in the event of a failure of any of the packet forwarding modules carrying higher priority traffic and requiring a protect packet forwarding module to service that failure.

Information is transferred from PFM 13-0 to internal optics modules (IOMs) 14 as chunk payloads of data, such that a chunk contains typically 400 bytes of payload data. Packets contained in virtual out queues of PFM 13-0 that are destined for the same egress PFM can be combined to form a single chunk payload of data. Thus, multiple small packets or just a segment of a larger packet can be loaded into a single chunk. A maximum of two chunks can be transferred from a PFM 13-0 to the IOMs 14-0W0 and 14-1W0 during each chunk period. The same chunks are replicated and transferred in parallel to IOMs 14-0W1 and 14-1W1.

IOM modules 14 encapsulate FEC code words as multiple redundant check symbols into each of the chunks. The present implementation uses a conventional interleaved Reed-Solomon FEC coding. IO modules 14-0W0, 14-1W0 provide duplicate working module capacity for a working zero optical switch plane. Similarly IO modules 14-0W1, 14-1W1 provide duplicate working module capacity for a working one optical switch plane. Switch plane pairs in this case are not configured as working and protect, but as working zero and working one copies respectively, such that copy zero switch plane containing optical switch modules 15-1 through 15-6 and duplicate copy one switch plane containing optical switch modules 16-1 through 16-6 each provide 6 optical switches worth of capacity.

IO module 14-0W0 transfers information from PFM 13-0 to one of three optical switch modules 15-1, 15-2 and 15-3. IO module 14-0W0 sends the information to the appropriate optical switch module based on the decisions of a central arbiter module (not shown in the figures). Illustratively, one input comes into an optical switch module and one output goes out from that same optical switch module. In an actual system, these inputs and outputs in fact provide connectivity across router system 10. FIG. 1B shows optical switch module 15-1 connected to an egress side internal optics module 17-0W0 through an output fiber 110-1. For clarity, six such optical switch modules 15-1 through 15-6 are shown in the top portion of FIG. 1B. In fact, in one implementation each of these optical switch modules has 64 optical fibers in and 64 optical fibers out, with these 64 optical fiber pairs fanning out to a great many different line shelves. Different shelves have multiple fiber inputs and outputs. Six parallel optical switch modules 15-1 through 15-6 provide 6 times the data capacity of a single switch module. Other embodiments can have for example, 36 of these modules rather than six.

Chunks of information are sent individually through optical switch modules 15-1 through 15-N and 16-1 through 16-N and received by IO modules 17 on line shelves at the egress side of router 10. IO module 17 checks the FEC check symbols to validate the accuracy of the data bits within the chunk. It then removes the FEC check symbols and transfers the resulting chunk payloads to packet forwarding module 18-0, 18-1, 18-2, 18-3, or 18-4 as appropriate for each destination address. Similarly, the working one optical switch plane containing optical switch modules 16-1 through 16-N does substantially the same thing in parallel. Thus, working zero and working one optical switch planes perform this process duplicatively and in parallel. This allows the packet forwarding modules on the egress side, such as PFM 18-0, to select those chunk payloads that are error free either from working zero or from working one optical switch plane on a chunk by chunk basis. If there is an error in an optical switch, then egress PFM modules 18-0 through 18-N can identify which working plane, zero or one, is accurate. Consequently errors in a switch are contained and do not ripple out through the network.

If there are only a few bit errors going through a switch, those errors can be corrected in real time by FEC decoding in IO modules 17. If a path through a working zero optical switch fails completely, then a path through the working one optical plane can be utilized instead. Further, because each IO module 17 computes the corrupted bits and how many bits were corrected on every path of the system, IO modules 17 provide a detailed fault analysis not only of the failed fiber or optical switch plane, but even down to the level of an individual switch defect, which then can also be isolated. Importantly, the data flowing across for example OS Module 15-1 and the data flowing across OS Module 16-1 in the absence of failures in the system are identical, byte for byte. This provides a hot standby, chunk for chunk.

After selecting error-free chunk payloads, packet forwarding modules 18-0 through 18-N then reassemble the chunks into individual IP packets and forward those packets across interface links 104, as previously described.

In FIGS. 1A-1C for the purpose of clarity, corresponding input and output functions are shown on separate circuit cards in separate ½ line shelves 142 and 143 respectively. In some embodiments corresponding input and output functions are combined on a single circuit card in a single line shelf combining ½ line shelves 142 and 143, thereby creating a folded configuration. For example, working input facility module 11-0W and working output facility module 12-0W can be combined on a single physical printed circuit card with two optical connectors, one in and one out. Similarly protect input facility module 11-0P and protect output facility module 12-0P can be combined on a single physical circuit card with two optical connectors, one in and one out. Likewise, input and output packet forwarding modules 13-0 and 18-0 also can be combined on a single physical circuit card in a single line shelf. In a folded configuration, if packet forwarding modules 13-0 and 18-0 share the sane physical card, then there is a single card for Channel 0, likewise a single card each for, Channels 1, 2, 3, and a fifth card for a Protect channel 4. Because there is a single physical card for input and output functions, then if a card fails, the protection ratio is equal for both input and output modules on that card. In some embodiments internal optics modules 14-0W0 and 17-0W0 similarly share the same physical circuit card, which in the present implementation is contained in the same line shelf 142, 143 with combined input/output facility modules 11, 12 and combined input/output packet forwarding modules 13, 18.

FIG. 2 is a block diagram illustrating data flow through facility modules 11-0W and 12-0W, for example, in more detail. Facility optical fibers are connected on the left through input and output interfaces 101-0W and 102-0W respectively. In a preferred embodiment shown in FIG. 2, for purposes of illustration input and output facility modules 11-0W and 12-0W occupy the same circuit board in the same line shelf in a folded configuration. In other embodiments, the input and output facility modules 11-0W and 12-0W are located on separate physical circuit cards.

A signal, e.g., a packet-over-SONET (POS) formatted IP packet, arrives at input 101-0W to a signal processing module 201 typically in a ten-Gbit/sec OC192 SONET datastream. Processing module 201 contains an optical receiver, an optical multiplexer and associated demultiplexer, and a transmitter associated with those. For example, the received signal is demodulated from optical input 101-0W into an electronic signal, and then demultiplexed from a single ten-Gbit-per-second datastream in this example down to a parallel bus at a lower data speed. That parallel bus of signals then leaves module 201 and goes into a processing module 202. Module 202 contains an OC192 demultiplexer, which extracts a single 2.5 Gbit/second OC48 substream out of the OC192 stream and delivers a packet-over-SONET (POS) input to a framer 203-1, which is an industry standard off the shelf component. Likewise, module 202 extracts the other three OC48 substreams and sends these to POS framers 203-2, 203-3, and 203-4 respectively. At this point there are four parallel 2.5 Gbit/sec SONET streams, one to each of four POS framers 203-1 through 203-4, which extract from each OC48 stream the individual IP packets. POS framers 203-1 through 203-4 first have to find the IP packets in the datastream and then have to extract the packets from the SONET continuous datastream. This is done on the four parallel OC48 streams. Once it has removed the packets from the SONET frame, each POS framer 203-1 through 203-4 delivers those packets to a facility ASIC 204-1 through 204-4 respectively.

The principal function of facility ASICs 204-1 through 204-4 is to send that information to an appropriate packet forwarding module (not shown in FIG. 2), in this case through an interface 103-0W consisting of four parallel interfaces for the four packet streams, or, if directed, to receive packets from an upstream neighboring facility ASIC on an interface 103-4W and switch 103-4W to 103-0W in a protect mode. Otherwise, in a working mode of operation, a facility ASIC sends the information out through interface 103-0W, and information input on 103-4W is directed through cascading protection bus interface 105-0W. The normal sequence is for a facility ASIC to take information from above and switch it below, letting the received traffic pass straight through onto interface 103-0W. All four of facility ASIC switches 204-1 through 204-4 are ganged, such that they operate in parallel. With faster buses, faster framers, or faster facility ASICs, a single ASIC or bus, for example, could perform the above described functions instead of four required at the present state of technology.

Referring again to FIG. 2, on the egress side facility ASIC 204-1 directs the information packets through output link 211 to Packet-over-SONET framer 203-1, which receives a packet, inserts it into a SONET frame, producing a 2.5 gigabit/second datastream or parallel bus equivalent, and sends that frame to OC192 add/drop multiplexer 202. Multiplexer 202 combines four 2.5 gigabit/second streams from POS framers 203-1 through 203-4, multiplexes them together into a 10 gigabit/second datastream, and delivers them to optical transceiver 201. Transceiver 201 receives the 10 gigabit/second stream, which is formatted as a parallel bus, and multiplexes it into a single datastream, which modulates a laser diode. This produces a SONET ten-gigabit/second optical format, which is transmitted through outbound optical facility interface link 102-0W.

FIG. 3 is a block diagram illustrating information flow through a typical packet forwarding module 13-0 (18-0). Facility ASICs 301-1 through 301-4 on the ingress side receive packets from facility modules working and protect 11-0W and 11-0P through single links 103-0W0 through 103-0W3. A principal function of facility ASICs 301-1 through 301-4 on the ingress side is to select between the working and the protection facility modules, as represented by the information on, for example, incoming path 103-0W0 or 103-0P0. That selection is made based on the standard SONET criteria for defining if one or both of those incoming facility modules is flawed or failed and also based on any detection of local errors or failures on working facility module 11-0W or protect facility module 11-0P.

In the egress direction, a principal function of facility ASICs 301-1 through 301-4 is to duplicate the packet stream coming out of egress ASIC 302 and to send that packet stream out across both outgoing paths 104-0W0 and 104-0P0 to facility modules 12-0W and 12-0P (see FIG. 2).

Packet forwarding engines 306-1 through 306-4 are devices that inspect the packet headers of all of the incoming packets received on any of the selected working or protect facility modules that are associated with this particular packet forwarding module 13-0 (18-0). Based on the inspection of those headers, a determination of the intended destination of each packet can be made. The header information is stored by an ingress ASIC 304 in various queues and lists, which are used to determine for any given packet which output port of the router it should exit, when it should exit, and its relative priority. Actual packet data is stored by ingress ASIC 304 in an external RAM memory 305. Packet forwarding engine 306-1 through 306-4 also determines if any particular packet is intended for a local destination within this particular router and redirects it toward the main control processor of the router instead of transmitting it downstream out one of the output ports of the router to a peer router across the network.

Ingress ASIC 304, based on the states of the various queues that it maintains and based on the destination addresses of the various packets that are represented by headers in those queues, sends requests through optical transceiver units 308-W and 308-P across optical link 310 (typically multimode ribbon fiber) to the central arbiter (not shown in FIG. 3). The central arbiter determines, based on all of the packets that are being processed through the router in aggregate at any given time, which of the requests from a particular ingress ASIC should be granted and when it should be granted for transmission across the optical switch. Grants of those requests return across optical link 310 through transceivers 308-W and 308-P back to ingress ASIC 304. Ingress ASIC 304 uses that grant information to extract packets from memory 305 in the appropriate order and assembles them into chunk payloads. At the appropriate times ingress ASIC 304 sends those chunk payloads across channels 107-00 A through 107-03 to internal optics modules 14-0W0 through 14-NW1 (see FIG. 1B).

On the egress side, information chunk payloads are received from the optical switch matrix indirectly through internal optics modules 17-0W0 through 17-NW1 (see FIG. 1B) across links 108-00 through 108-03 into an egress ASIC 302. Egress ASIC 302 reconfigures the chunks into packets and again stores the packets in a memory 303 in the form of queues and structures. Egress ASIC 302 subsequently reads those packets out again into one of the four facility ASICs 301-1 through 301-4. At the facility ASIC, each of those packet streams is duplicated and sent in tandem to both working and protect facility modules 12-0W and 12-0P.

A line control processor 307 located on packet forwarding module 13-0 (18-0) is primarily responsible for controlling the facility protection switching function by examining the SONET error and failure indications from facility modules 11-0W and 11-0P and also by analyzing the indications that facility ASICs 301-1 through 301-4 develop from those incoming signals. The appropriate switching decisions are made in software and logic and are then implemented by line control processor 307.

FIG. 4 is a schematic diagram illustrating an alternative implementation 400 of facility module 11-0W (12-0W) shown in FIG. 2. Facility module implementation 400 performs essentially the identical function described in connection with FIG. 2, except that, instead of having 10 gigabit/second single fiber input 101-0W and single fiber output 102-0W, it has four parallel 2.5 gigabit/second input fibers 101-0W1, 101-0W2, 101-0W3, and 101-0W4 and four parallel 2.5 gigabit/second output fibers 102-0W1, 102-0W2, 102-0W3, and 102-0W4 out. SONET standards include OC192 at 10 gigabits/second, and OC48 at 2.5 gigabits/second used in the embodiment of FIG. 4. FIG. 4 employs of four parallel optical transceivers, 401-1 through 401-4, which essentially replace transceiver module 201 and add/drop module 202 of FIG. 2. Interface links 214-1 and 215-1 from transceiver 401-1 to POS framer 203-1 in FIG. 4 are identical to respective links 214-1 and 215-1 of FIG. 2. The difference is merely that of the optical interface to the facility. Facility ASICs 204-1 through 204-4S, OC48 POS framers 203-1 through 203-4, and switching operations, e.g. described in connection with FIG. 2, are identical for facility module implementations of FIGS. 2 and 4.

In a further alternative embodiment to that of FIG. 2, the ten-gigabit/second SONET facility interface 101-0W and 102-0W of FIG. 2 is replaced with a ten-gigabit/second Ethernet interface. In this case since the input data stream contains packets in Ethernet and not SONET framing, input and output modules 201, 202, and 203 are different, but facility ASICS 204-1 through 204-4 remain the same as those described in connection with FIG. 2. Between eight and ten parallel single-gigabit/second Ethernet modules are also possible in this case. This is similar to the embodiment of FIG. 4, except that transceivers 401 and POS framers 203 are replaced by single or multiple one-gigabit/second Ethernet interfaces instead of SONET interfaces. In the case of ten-gigabit/second Ethernet or one-gigabit/second Ethernet, current industry standards do not define facility protection functionality. Accordingly, only working facility modules 101-0W, 102-0W would be installed on any interface ports that utilize those standards.

Figure 5:
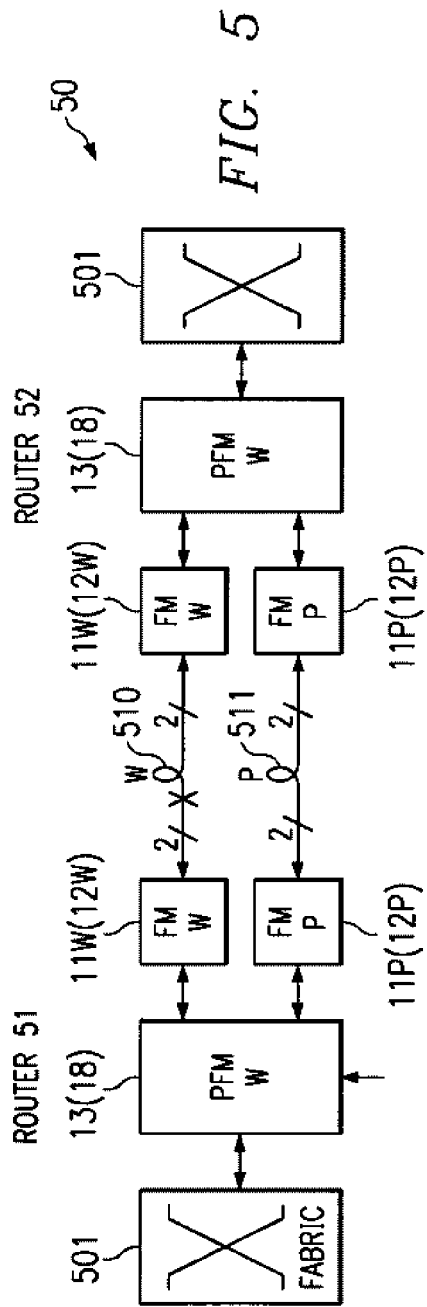
FIG. 5 is an overview block diagram illustrating a network incorporating embodiments of the present invention.

FIG. 5 is an overview block diagram illustrating a network 50 incorporating embodiments of the present invention. Network 50 includes a switch fabric 501 combining the elements of internal optics modules 14, 17 and optical switch modules 15, 16 (see FIGS. 1A-1C). In this context a fabric is a collection of devices which cooperatively provides a general routing capability. Typically, communication moves between two routers 51 and 52 (for simplicity shown only partially in FIG. 5) of network 50 over duplex optical channels 510 and 511. This information arrives at facility module 11W (12W) and the same information arrives at facility module 11P (12P) and is passed to packet forwarding module (PFM) 13 (18), as described above in connection with FIGS. 1A-1C. Assuming both optical channels 510, 511 are working properly, then packet forwarding modules 13 (18) determine which channel 510, 511 to utilize and, if both channels are equal then utilize a default channel, for example channel 510. PFM 13 (18) passes the information on through network 50 to switch fabric 501 or as otherwise selected by SONET 'K' Bytes.

In the event of a fault on channel 510, for example at point X, then because packet forwarding module (PFM) 13 (18) of router 51 is transmitting identical packets over both channels 510 and 511, packet forwarding module working 13 (18) on router 52, without any external network intelligence or intervention, can select that same traffic from channel 511. A similar process occurs for packets transmitted in the reverse direction from router 52 to router 51. This has the effect of limiting the impact of a failure of channel 510 strictly to the two routers 51 and 52, and in fact strictly to the local intelligence that monitors packet forwarding modules 13 (18) and facility modules 11 (12) on each router 51, 52. Note that a break in information coming into router 52 over channel 510 is detected at router 52. Likewise, a break in information that is going towards router 51 over channel 510 is detected at router 51. Accordingly, there is no need for communication between routers 51 and 52 with respect to rerouting any information, because each router 51, 52 independently makes the decision to accept the information moving on the surviving parallel bi-directional channel 511. These decisions are made independently but are based upon the same occurrence, whether it be a break or simply faulty information on channel 510. Information may of course be faulty in one direction only and, therefore, router 51 can accept and process information coming in its direction on channel 510, whereas router 52 can concurrently process information coming in its direction on channel 511, each router making independent decisions. Importantly, in all the above cases there is no involvement by any peer routers in a wider scale network outside of routers 51, 52 in making decisions with respect to how to respond to a particular fault in network 50.

Figure 6:
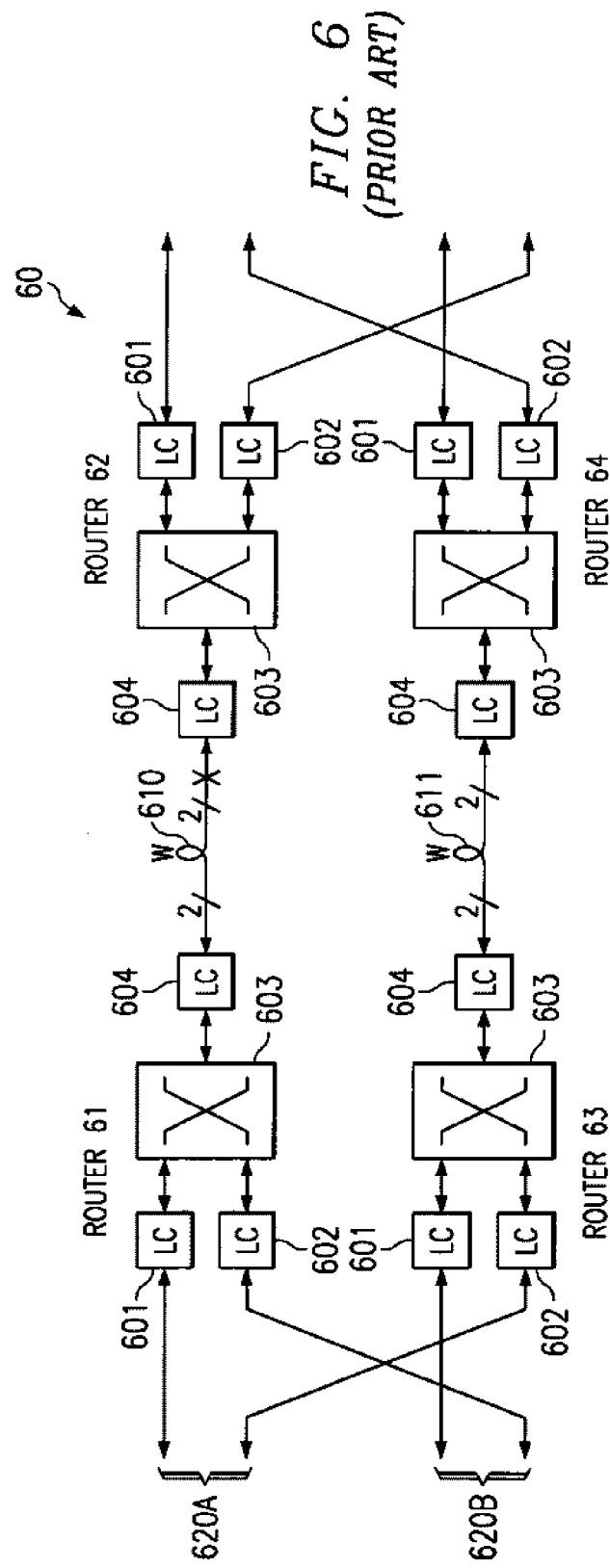
FIG. 6 is a block diagram illustrating a network incorporating prior art routers, showing the method by which prior art deals with faulty information on one of a pair of bi-directional channels.

FIG. 6 is a block diagram illustrating a network 60 incorporating a typical prior art set of routers 61, 62, 63, and 64, showing the method by which prior art deals with the same problem of faulty information on one of a pair of bi-directional channels discussed above with respect to FIG. 5. Router 61 and router 63 typically are co-resident in a particular location. Router 62 and router 64 are similarly co-resident in a different particular location. Redundancy of channels between those locations is provided through bi-directional channel 610 between router 61 and 62 and bi-directional channel 611 between router 63 and 64. Line cards (interface modules) 601, 602, and 604 in FIG. 6 each combine the functions of a single facility module and a single packet forwarding module, for example facility module 11W (12W) and packet forwarding module 13 (18) of FIG. 5. Assuming a break in channel 610, neither router 61 nor router 62 can make the necessary adjustments to recover that traffic. On the contrary, it is necessary for router 61 and router 62 to notify upstream and downstream peer routers (not shown) which can be operating geographically remote from routers 61-64, that a failure on channel 610 had occurred. These upstream and downstream peer routers then begin redirecting packet traffic that had been intended, for example, through routers 61 and 62 through alternative channels, for example through router 63 across channel 611 into router 64, and then on to a downstream destination.

Upstream routers sending IP packets originally destined to go through router 62 and out of router 62 to an ultimate destination have to rewire their programming to recognize that same IP packet address now has to follow a different route through network 60. Instead of sending it to ports 620A, it now has to reroute an IP packet having the same destination address, instead, for example to ports 620B, which then relay it to router 63, which then in turn forwards it through router 64 and out through interface module 602 on router 64. Accordingly, a fault between router 61 and router 62 has to be signaled to upstream peer routers such that they can rewire their routing tables. Similarly, downstream peer routers must rewire their routing tables, so that return packets also take an alternative route. Thus, in addition to router 61 and router 62 being affected by the failure, router 63 and router 64 are both affected, as well as all possible upstream peer routers and all possible downstream peer routers.

By contrast, in network 50 of FIG. 5 embodying principles of the present invention, only router 51 and router 52 are affected by an equivalent fault, each of which routers makes its own determination as to what it is to do internally and need not communicate any of its decisions to any router external to itself. Router 51 and router 52 do not, in fact, alter their routing tables at all, because protection facility modules 11P (12P) do not change the port designation on which IP packets enter or exit switch fabric 501. Therefore, under fault conditions the mapping between IP addresses and physical port numbers remains unchanged, both internal and external to network 50.

Figure 7:
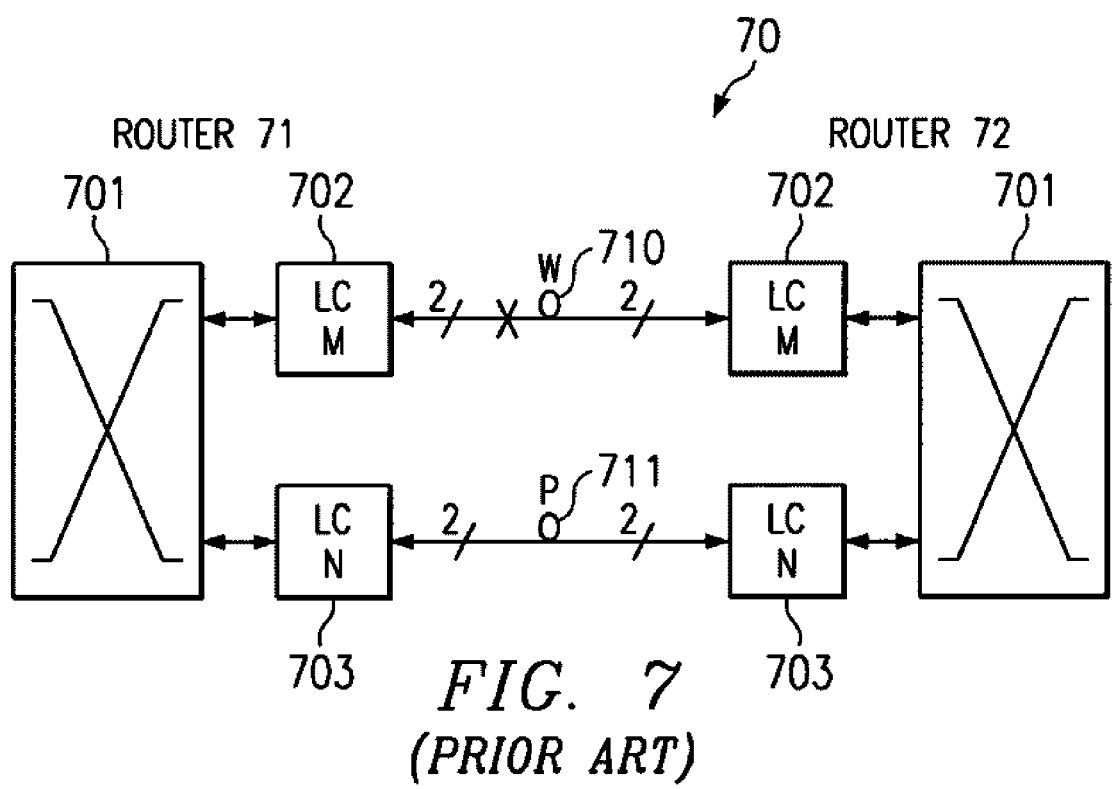
FIG. 7 is a block diagram showing a simplified form of the prior art network of FIG. 6 for ease of comparison with the network of FIG. 5.

FIG. 7 is a block diagram showing a prior art network 70 representing a simplified form of network 60 of FIG. 6 for ease of comparison with network 50 of FIG. 5. Assuming that the total traffic under normal service conditions traveling from router 71 to router 72 is 100% of the channel capacity of either bi-directional channel 710 or 711 (or comparatively channel 510 or 511 in FIG. 5), then the relative costs of these two approaches in order to maintain that channel capacity can be compared. In the case of FIG. 5, router 51 duplicates facility modules 11W (12W) and 11P (12P), each facility module having a capacity of 100%, but it does not duplicate packet forwarding module 13 (18). Router 51 has a single packet forwarding module 13 (18) with a capacity of 100%. In the event of failure of channel 510, the channel capacity of PFM 13 (18) is redirected entirely to service channel 511, thereby maintaining 100% channel capacity despite failure of channel 510. In FIG. 7, to maintain the same 100% channel capacity under failure conditions, it is necessary to effectively duplicate the channel capacity of line card 702 and line card 703 completely, each of which includes the functionality and cost associated with both a facility module and a packet forwarding module, as described above in connection with FIG. 6. The capacity of switch fabric 701 is also included as part of that cost.

In network 50 shown in FIG. 5, implementation of fault protection consumes one port of switch fabric 501, one packet forwarding module, and two facility modules. In network 70 shown in FIG. 7, fault protection implementation consumes two ports of switch fabric 701 and two packet forwarding modules 702 and 703, each of which includes a single facility module. Accordingly, a total of two PFMs, two facility modules and two switch ports is required for fault protection in FIG. 7, whereas network 50 of FIG. 5 requires only one switch port, one PFM and two facility modules for a comparable level of fault protection.

Referring again to FIG. 3, each packet forwarding module 13 packages chunk payloads as described earlier and sends identical streams of chunk payloads to both working 1 and working 0 copies of the optical switch fabric via internal optics modules (IOMs) 14-0W0 through 14-NW1 (see FIG. 1B), which encapsulates the chunk payloads into chunks. Working 0 copy of the optical switch fabric (see FIG. 1B) includes internal optics modules 14-0W0 and 14-1W0, optical switch modules 15-1 through 15-6, and internal optics modules 17-0W0 and 17-1W0, whereas working 1 copy of the optical switch fabric includes internal optics modules 14-0W1 and 14-1W1, optical switch modules 16-1 through 16-6, and internal optics modules 17-0W1 and 17-1W1. For example, IOM 14-0W0 and IOM 14-0W1 each receive simultaneous sequences of chunk payloads from each packet forwarding module 13 that is transmitting through those two IOMs. Similarly, on the egress side each packet forwarding module 18-0 through 18-N (see FIG. 1C) receives a simultaneous sequence of chunk payloads from IOMs 17-0W0 and 17-0W1, for example. In error-free normal working operation of both optical switch fabrics, the simultaneous sequences of chunk data delivered to each packet forwarding module are identical. In the event of a failure of any kind, either within a chunk or across multiple chunks on either copy zero or copy one of the optical switch fabric, the affected IOM is able to detect that failure based on comparison of the received FEC check sums with the calculated FEC check sums. When a failure on a particular chunk from either working zero or working one copy of the optical switch fabric is detected, the IOM inserts a failure indication downstream toward PFMs 18. This forces PFM 18 to select the error-free chunk data from the alternate copy of the optical switch fabric. This can be done individually for each chunk payload delivered to a particular PFM.

Note that while embodiments of the invention have been described in terms of two SONET standards namely OC48 and OC192, alternative implementations of router 10 having an appropriate facility module can operate under other standards.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of principal objects of the present invention and thus are not in general protected against.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A router system configured for distributing information packets from multiple sources to multiple destinations within a network, said router system comprising:
   a plurality of input and output facility interface circuit cards;
   a plurality of line cards different from said facility interface circuit cards, said line cards being configured to perform packet forwarding functions;
   a redundant pair of said facility interface circuit cards connected in parallel to each said line card, such that one and only one said line cards is connected to each of said paired redundant interface circuit cards; and
   wherein each of said facility interface circuit cards is connected to one and only one said line card.

2. The router system of claim 1 wherein said paired redundant interface circuit cards are configured to operate in a one-for-one protection mode.

3. The router system of claim 1, further comprising a control processor located on said line card, wherein said control processor is configured to control functions of said line card and of said facility interface circuit card connected to said line card.

4. A communication network comprising a first router system, said first router system comprising:
   a plurality of input and output interface ports, each of said input and output interface ports comprising two paired duplicate interface circuit cards;
   a line card different from said interface circuit card, said line card being configured to perform packet forwarding functions; and
   wherein said paired duplicate interface circuit cards are each connected in parallel with one and only one said line card, such that one and only one said line card is connected to each of said paired duplicate interface circuit cards.

5. The communication network of claim 4 wherein said first router system is disposed in a folded configuration, such that each of said paired duplicate interface circuit cards contains duplex input and output interface ports.

6. The communication network of claim 4 wherein said first router system is disposed in a folded configuration, such that each of said line cards is configured to perform both input and output packet forwarding functions.

7. The communication network of claim 4 wherein said first router system comprises 320 input interface ports and 320 output interface ports.

8. The communication network of claim 4 further comprising a second router system, said second router system comprising:
   a plurality of input and output interface ports, each of said input and output interface ports comprising two paired duplicate interface circuit cards;
   a line card different from said interface circuit card, said line card being configured to perform packet forwarding functions;
   wherein said paired duplicate interface circuit cards are each connected in parallel with one said line card, such that one said line card is connected to each of said paired duplicate interface circuit cards; and
   said second router system being interconnected with said first router system through duplicate data paths, such that each of said paired duplicate interface circuit cards of said first router system is interconnected to one of said paired duplicate interface circuit cards of said second router system through one of said duplicate data paths.

9. The communication network of claim 8 wherein each of said duplicate data paths is configured to carry duplex data between said first and said second router systems.

10. The communication network of claim 4 wherein said first router system further comprises an optical switch, having an N by M crossbar configuration, said optical switch being located within the core of the router system and having a plurality of ingress ports and a plurality of egress ports, wherein N is the integer number of ingress ports and M is the integer number of egress ports of said optical switch.

11. The communication network of claim 10 wherein N is equal to M.

12. The communication network of claim 10 wherein N is not equal to M.

13. The communication network of claim 11 wherein N is greater than 10.

14. The communication network of claim 13 wherein N is greater than 40.

15. The communication network of claim 14 wherein N is greater than 60.

16. The communication network of claim 12 wherein N and M are each greater than 10.

17. The communication network of claim 16 wherein N and M are each greater than 40.

18. The communication network of claim 17 wherein N and M are each greater than 60.

19. The communication network of claim 10 wherein said first router system further comprises a plurality of said optical switches.

20. The communication network of claim 8 wherein each of said duplicate data paths comprises an optical fiber.

21. The communication network of claim 20 wherein each of said duplicate data paths comprises duplex optical fibers.

22. A method of distributing data streams within a communication system containing a plurality of router systems, said method comprising:
   receiving duplicate data streams at two paired duplicate interface circuit cards of a first router system;
   delivering said duplicate data streams from said two paired duplicate interface circuit cards to one and only one line card separate from said two paired duplicate interface circuit cards;
   examining said duplicate data streams in accordance with predetermined selection criteria; and
   if one said duplicate data stream satisfies said criteria and the second said duplicate data stream does not satisfy said criteria, then selecting said duplicate data stream that satisfies said criteria and discarding said duplicate data stream that does not satisfy said criteria; and
   if both of said duplicate data streams satisfy said criteria, then arbitrarily selecting one of said duplicate data streams and arbitrarily discarding the non-selected duplicate data stream.

23. The method of claim 22 wherein said duplicate data streams are received through redundant data paths from a second router system within said communication system.

24. The method of claim 22 wherein said predetermined selection criteria include criteria selected from the group consisting of a SONET standard, a packet-over-SONET protocol, and an ETHERNET protocol.

25. The method of claim 22 wherein said examining, said selecting, and said discarding are performed at said line card.

26. The method of claim 22, further comprising performing packet forwarding functions.

27. The method of claim 26 wherein said packet forwarding functions are performed at said line card.

28. The method of claim 22 wherein said distribution of data streams is not interrupted by an occurrence selected from the group consisting of malfunction, failure, removal, and replacement of one of said two paired duplicate interface circuit cards.

29. The method of claim 22 wherein said received data streams comprise information packets encapsulated into frames.

30. The method of claim 29, further comprising extracting said information packets from said frames after receiving said data packets and before delivering said data packets to said line card.

31. The method of claim 23 wherein said redundant data paths comprise optical fibers.

32. The method of claim 31 wherein said redundant data paths comprise duplex optical fibers.

33. The method of claim 23 wherein routing addresses across said communication network are not changed by an occurrence within said first router system selected from the group consisting of malfunction, failure, removal, and replacement of one of said two paired duplicate interface circuit cards, such that data rerouting and route-flap are prevented in said second router system and are not broadcast in part or as a whole across said communication network.

34. The method of claim 23 wherein an occurrence of a failure within said data paths interconnecting said first router system with said second router system is detected and corrected independently by each of said first router system and said second router system, such that control communication between said first router system and said second router system is not required.

* * * * *